Figure 6:
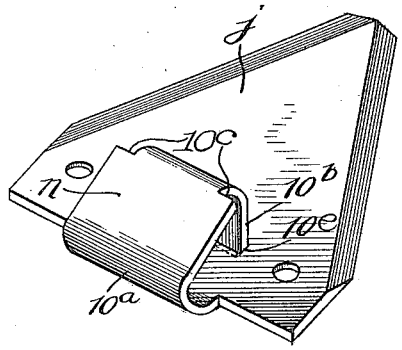

J. H. McELROY.
CUTTING APPARATUS FOR MOWING MACHINES, &c.
APPLICATION FILED MAR. 25, 1912.
1,158,521.
Patented Nov. 2, 1915.
2 SHEETS—SHEET 1.
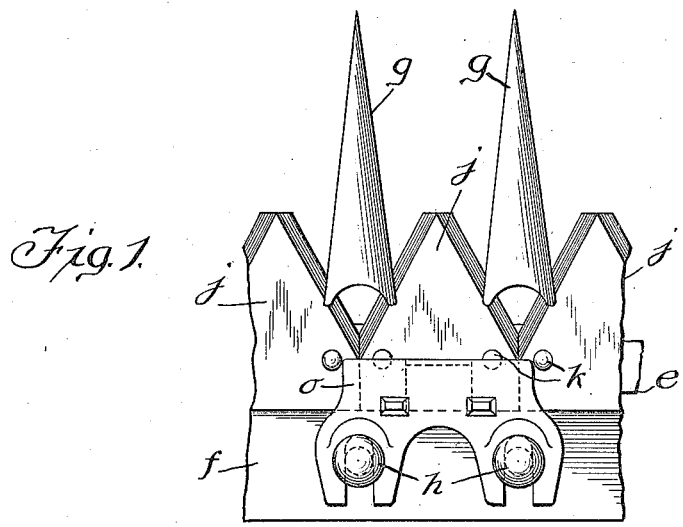
Fig. 1.
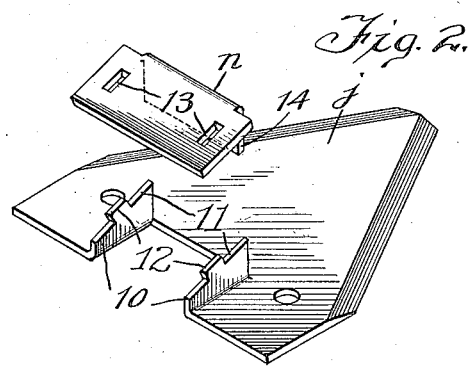
Fig. 2.
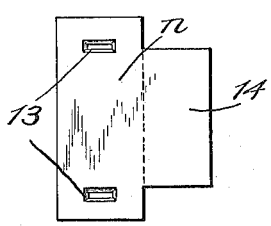
Fig. 5.
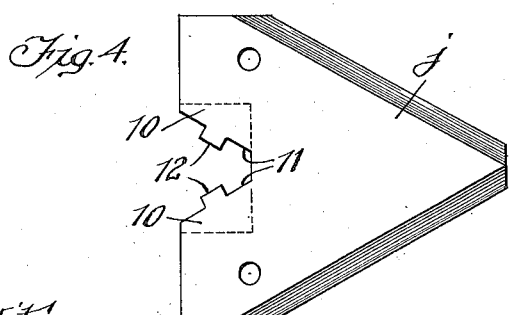
Fig. 4.
Fig. 3.
Witnesses:
W. P. Kilroy
R. Burkhardt
Inventor:
John Howard McElroy

UNITED STATES PATENT OFFICE.

JOHN HOWARD McELROY, OF CHICAGO, ILLINOIS.

CUTTING APPARATUS FOR MOWING-MACHINES, &c.

1,158,521.　　　　　Specification of Letters Patent.　　Patented Nov. 2, 1915.

Application filed March 25, 1912.　Serial No. 686,041.

*To all whom it may concern:*

Be it known that I, JOHN HOWARD MC-ELROY, a citizen of the United States, and a resident of Chicago, in the county of Cook and State of Illinois, have invented certain new and useful Improvements in Cutting Apparatus for Mowing-Machines, &c., of which the following is a full, clear, and exact specification.

My invention is concerned with cutting apparatus for mowing and reaping machines and grain harvesters, and is designed to produce a sickle construction which in efficiency shall be very much superior to any now in use.

As is well known to those skilled in the art, the grass being cut tends to get between the knife sections and the ledger plates, thereby raising the sections from the plates and preventing a shear cut, and various constructions have been devised to overcome this difficulty, such, for instance, as those employing springs to hold the knife sections down on the ledger plates. It is also well known that the resistance of the grass to the shearing action tends to thrust the cutter bar and the attached knife sections backward, and my invention consists of a simple and inexpensive construction in which this backward thrust is utilized to hold the knife sections down on the ledger plates and prevent their separation, thus insuring a shear cut and a clean knife under all conditions. While the problem seems simple, yet it is complicated by the fact that the moving parts tend to "gum" up, owing to the sticky juice or sap of some of the grasses or weeds cut in using the apparatus, and then, too, dirt and other foreign matters besides the grass assist in the clogging action, and the apparatus must be such as to operate in spite of this gumming or clogging tendency. None of the devices heretofore proposed to carry out the objects and purposes of my invention are constructed so that they will operate because they do not take care of this tendency, and none of them are in use today, despite the crying need therefor. By my novel construction I secure the desired pressure of the knife sections on the ledger plates, and the same backward thrust on the cutter bar which I utilize to produce the aforesaid pressure also serves to produce a pressure and scraping action between the bearing surfaces which I employ in my invention, which scraping action keeps the aforesaid bearing surfaces absolutely clean, which surfaces otherwise would tend to gum up.

To illustrate my invention, I annex hereto two sheets of drawings, in which the same reference characters are used to designate identical parts in all the figures, of which,—

Figure 7:
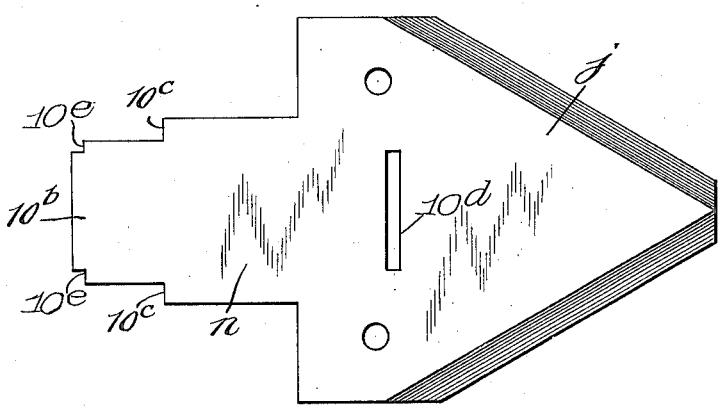

Figure 1 is a plan view of portions of a cutter bar and finger bar having my invention applied thereto; Fig. 2 is a perspective view of the preferred form of the combined section and bearing plate with the plate separated from the section; Fig. 3 is a central longitudinal section through the knife section and bearing plate, with the parts secured together; Fig. 4 is a top plan view of the knife section as it is blanked and before the abutment portions are turned up; Fig. 5 is a plan view of the bearing-plate portion as it is blanked and before the covering side is turned down; Fig. 6 is a perspective view of another and simpler form of my invention; Fig. 7 is a top plan view of the section as it is blanked out; and Fig. 8 is a side elevation of the same after it has been completely formed.

In the general combination, on which my invention is an improvement, the finger bar $f$ has bolted thereon, by the bolts $h$ which secure the fingers $g$ to the under side thereof, the overhanging knife clips $o$, which have the inclined bearing surface on the under side thereof adapted to coöperate with the correspondingly inclined bearing surface $n$ of the clip blocks.

In the preferred form of my improved construction, I employ the lugs 10, which are formed from the body of the knife section $j$ after the same has been blanked as shown in Fig. 4. The upper surfaces 11 of the abutments 10 are inclined at the same angle as the under surface or bearing portion of the overhanging clip $o$, so that when the bearing plate $n$ is secured on these surfaces 11, the upper surface thereof (it being of sheet metal and of uniform thickness) will be presented to the bearing surface at the same angle. The abutments 10 have the lugs or projections 12, which are adapted to pass through apertures 13 in the plate $n$, which apertures preferably have their sides inclined so that the upper portions of the lugs 12 can be spread into the widened tops of the apertures to firmly secure the plate in place without causing the lugs 12 to project above the general plane of the upper face of the plate n. With this construction I preferably employ the tongue 14 projecting from the forward side of the plate and turned down as shown, so that it fits between the forward edges of the abutments 10, and serves to close the opening that would otherwise exist between the abutments 10, the knife section j and the plate n, which opening would be objectionable on account of the possibility of dirt getting into it and interfering with the free movement of the cutter bar e on the finger bar f. With this form, the bearing surface of the plate n can be hardened as much as may be desired before it is secured on the knife section.

Figure 8:
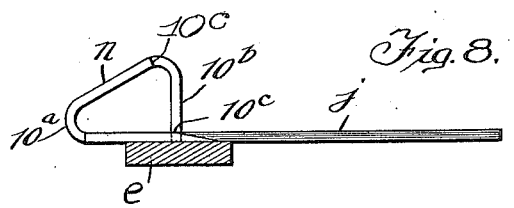

In the simpler form shown in Figs. 6, 7 and 8, the same knife section j and the same bearing plate n are employed, but instead of having the abutments 10 at the ends of the plate, I form them at the sides of the plate, the curved connecting portion 10ª constituting one of the abutments, while the vertical extension 10ᵇ constitutes the other. In this form, the knife section j, the bearing plate n and the abutments 10ª and 10ᵇ are integral, and the complete plate is originally blanked out as shown in Fig. 7, after which the extension 10ᵇ is turned to the proper angle to the bearing surface n, and finally the connecting portion 10ª is formed, so that the bearing plate n and the forward abutment 10ᵇ are turned to the position shown in Figs. 6 and 8. To retain the square cleaning edges of the plate n, I preferably offset the abutment 10ᵇ as shown at 10ᶜ. To prevent any tendency of the abutment 10ᵇ to move from its vertical position under the thrust on the plate n, I provide the slot 10ᵈ in the knife section j which receives the end of the abutment 10ᵇ, which end may be reduced by forming the shoulders 10ᵉ to rest on the edges of the slot 10ᵈ, although these shoulders are not necessary where the cutter bar e is directly beneath the slot 10ᵈ, as shown in Fig. 8.

While I have herein shown and described the specific modification disclosed in Figs. 6 to 8, inclusive, I do not herein claim said modification, but reserve the same for a divisional application.

While I have shown and described my invention as embodied in the forms which I at present consider best adapted to carry out its purposes, it will be understood that it is capable of some modifications, and that I do not desire to be limited in the interpretation of the following claims except as may be necessitated by the state of the prior art.

What I claim as my invention, and desire to secure by Letters Patent of the United States, is:

1. A knife section for the purpose described, having abutment members formed from the body thereof and extending upward at right angles thereto, and a plate supported by said abutment members in an inclined position so as to form an inclined bearing surface on the upper face thereof, substantially as described.

2. A knife section having a pair of abutment members struck up from the body thereof and extending upward at right angles thereto, and a bearing plate supported at its ends by said abutment members in an inclined position so as to form an inclined bearing surface, substantially as described.

3. A knife section having a pair of abutment members struck up from the body thereof, and having their upper surfaces at an angle to the knife section and provided with rivet lugs, together with a sheet-metal plate having apertures through which the rivet lugs of the abutment members pass, substantially as described.

4. A knife section having a pair of abutment members struck up from the body thereof, and a bearing plate supported at its ends from said abutment members and having an inclined bearing surface, together with a downwardly extending portion between the abutments, substantially as and for the purpose described.

In witness whereof I have hereunto set my hand and affixed my seal, this 23rd day of March, A. D. 1912.

JOHN HOWARD McELROY. [L. S.]

Witnesses:
　MILDRED ELSNER,
　JNO. G. ELLIOTT.